United States Patent
De Lany et al.

(10) Patent No.: US 10,098,276 B2
(45) Date of Patent: *Oct. 16, 2018

(54) SOIL INJECTION SYSTEM AND METHOD

(71) Applicant: AQUA CENTS WATER MANAGEMENT, LLC, Fresno, CA (US)

(72) Inventors: Thomas De Lany, Fresno, CA (US); Matthew James Andros, Paso Robles, CA (US); Garett John Stapp, Paso Robles, CA (US); Thomas Klippenstein, Paso Robles, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 15/425,927

(22) Filed: Feb. 6, 2017

(65) Prior Publication Data
US 2017/0208737 A1     Jul. 27, 2017

Related U.S. Application Data

(63) Continuation of application No. 14/346,708, filed as application No. PCT/US2012/056762 on Sep. 21, 2012, now Pat. No. 9,560,797.
(Continued)

(51) Int. Cl.
*A01B 33/06* (2006.01)
*A01B 33/10* (2006.01)
(Continued)

(52) U.S. Cl.
CPC .......... *A01C 23/026* (2013.01); *A01B 33/06* (2013.01); *A01B 33/106* (2013.01); *A01G 29/00* (2013.01)

(58) Field of Classification Search
CPC ....... A01B 33/06; A01B 33/106; A01B 33/10; A01B 33/08; A01C 23/026; A01C 23/023; A01C 23/02; A01C 23/00; A01G 29/00
See application file for complete search history.

(56) References Cited

U.S. PATENT DOCUMENTS 1,871,529 A    8/1932 Karshner
2,214,083 A    9/1940 Lester
(Continued)

FOREIGN PATENT DOCUMENTS

JP    08-051828 A    2/1996
JP    10-191737 A    7/1998
(Continued)

OTHER PUBLICATIONS

International Search Report and Written Opinion for International Application No. PCT/US2012/056762 dated Mar. 27, 2013; 11 pages.

*Primary Examiner* — Christopher J. Novosad
(74) *Attorney, Agent, or Firm* — Sherrie Flynn; Coleman & Horowitt LLP

(57) ABSTRACT

Methods and systems for applying a uniform layer of a substance such as a hydrogel or other fluid substance beneath a soil surface with minimal or little surface disturbance to the plants, the plant roots and the soil located on or slightly below the applied surface area. Embodiments include injecting a fluid substance into soil using at least one injector probe, a driver to drive the at least one injector probe into and out of the soil to and from a target depth, and a rotator mechanism configured to rotate the at least one injector probe about a central axis from one angular position to another angular position at the target depth.

20 Claims, 12 Drawing Sheets

Related U.S. Application Data

(60) Provisional application No. 61/538,785, filed on Sep. 23, 2011.

(51) Int. Cl.
*A01C 23/02* (2006.01)
*A01G 29/00* (2006.01)

(56) References Cited

U.S. PATENT DOCUMENTS

| | | | |
|---|---|---|---|
| 2,789,522 | A | 4/1957 | Barton |
| 3,017,200 | A | 1/1962 | Du Shane |
| 3,148,643 | A | 9/1964 | Mussett et al. |
| 3,602,166 | A | 8/1971 | Peterson |
| 3,791,322 | A | 2/1974 | Van Der Lely et al. |
| 3,926,131 | A | 12/1975 | Collins |
| 4,018,170 | A | 4/1977 | Van Der Lely et al. |
| 4,034,686 | A | 7/1977 | Collins |
| 4,178,860 | A | 12/1979 | Hines et al. |
| 4,850,291 | A | 7/1989 | Masuko et al. |
| 7,681,509 | B2 | 3/2010 | Bilak et al. |
| 9,560,797 | B2 * | 2/2017 | De Lany ................ A01G 29/00 |
| 2002/0148396 | A1 | 10/2002 | Allan et al. |
| 2006/0230997 | A1 | 10/2006 | Kirk |
| 2009/0294142 | A1 | 12/2009 | Straus et al. |
| 2010/0139159 | A1 | 6/2010 | Plate |

FOREIGN PATENT DOCUMENTS

| | | |
|---|---|---|
| JP | 11-032534 A | 2/1999 |
| JP | 2001046500 A | 2/2001 |

* cited by examiner

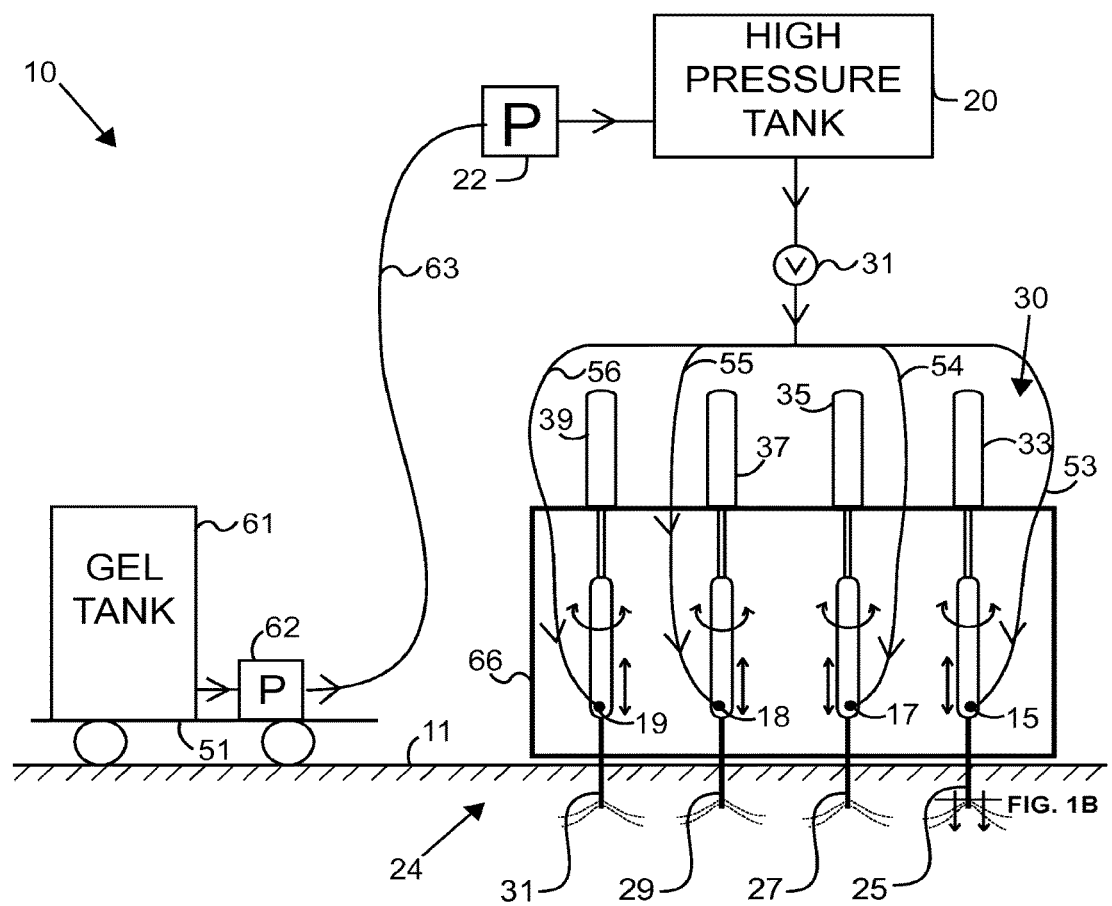
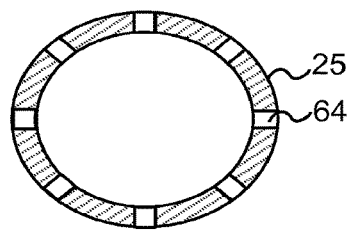
FIG. 1A
FIG. 1B

SECTION A-A

SOIL INJECTION SYSTEM AND METHOD

RELATED APPLICATION

This application is a continuation of U.S. patent application Ser. No. 14/346,708, filed Mar. 21, 2014, now U.S. Pat. No. 9,560,797, which is the U.S. National Stage Application of PCT No. US2012/056762, filed Sep. 21, 2012, which claims priority pursuant to 35 U.S.C. § 119(e) to U.S. provisional patent application Ser. No. 61/538,785, filed Sep. 23, 2011, all of which are incorporated herein by reference in their entireties.

FIELD OF THE INVENTION

The present invention relates in general to soil injection systems and methods. It more particularly relates to such systems and methods for injecting a various different substances into soil for a variety of purposes.

BACKGROUND OF THE INVENTION

There is no admission that the background art disclosed in this section legally constitutes prior art.

The use of fluid substances such, for example, as hydrogels or liquids as a soil amendment or other is well established. There are a number of different types of fluid substances including liquids and gels have been injected into the soil to help plant growth. For example, polyacrylamide (PAM), starch and polyacrylate gels have been used for this purpose. Use of hydrogels allows the retention of moisture in the soil or around crop roots. Substantial reduction in the use of irrigation water may be achieved by applying appropriate dosages of PAM to soil or other growing mediums for many applications. Reduction in the amount of irrigation water applied in agricultural and landscape applications may have the additional benefit of slowing the build-up of unwanted salts introduced through irrigation water. Additionally, additives may be incorporated into hydrogels, thereby effecting large savings in the amount of additives used, and consequently, in the amount of additives released to the environment. Such additives may include fertilizers and pesticides as well as others.

For record purposes, the following is a list of prior patents and applications disclosing various methods and devices for applying products to the soil: U.S. Pat. Nos. 1,871,529; 2,214,083; 2,789,522; 3,017,200; 3,148,643; 3,602,166; 3,791,322; 3,926,131; 4,018,170; 4,034,686; 4,178,860; 4,850,291; 5,115,750 and 5,667,019; and U.S. patent applications Nos. 2002/0148396 and 2006/0230997.

A variety of machines have been developed to facilitate the placement of hydrogels below the soil surface. These include tractor powered units that open up the soil surface through the use of specially designed plows and then drop dry granular material into the open slit. Other hand-held machines may use water and/or air to assist with insertion and transport of hydrogel solutions into soil at various depths through an injection device such as a hollow needle or spike. Landscape applications may require application of hydrogels in areas that have existing landscaping such as turf, shrubs and trees. Therefore, a machine used for many such applications should be maneuverable and compact.

A number of methods for applying hydrogels are known in the art. These include broadcasting, mixing with soil, or filling holes in the soil with a mixture of gel and a soil mix. These methods are all discussed in product literature from various manufacturers and/or distributors of these materials. Most methods are labor intensive, often involve an additional step in the planting process, and may cause damage to existing crops, plants, or turf. Each of these factors may contribute to inefficient use of the gel. Furthermore, each of these factors suffer from the disadvantage that they fail to distribute a uniform and consistent layer of the somewhat viscous gel below the surface of the soil to hold water for the plant roots. In short, the prior known distribution techniques have failed to effectively and efficiently deposit desired quantities of fluid substance below the surface of soil in a uniformly consistent manner to help plant growth or otherwise serve as an effective soil amendment.

BRIEF DESCRIPTION OF THE DRAWINGS

In order to better understand the invention and to see how the same may be carried out in practice, non-limiting preferred embodiments of the invention will now be described with reference to the accompanying drawings, in which:

FIG. 1A is a diagrammatic view of the system of FIG. 1.

FIG. 1B is an enlarged sectional view of the system of FIG. 1A taken substantially on line indicating FIG. 1B.

DETAILED DESCRIPTION OF THE INVENTION

Figure 1:
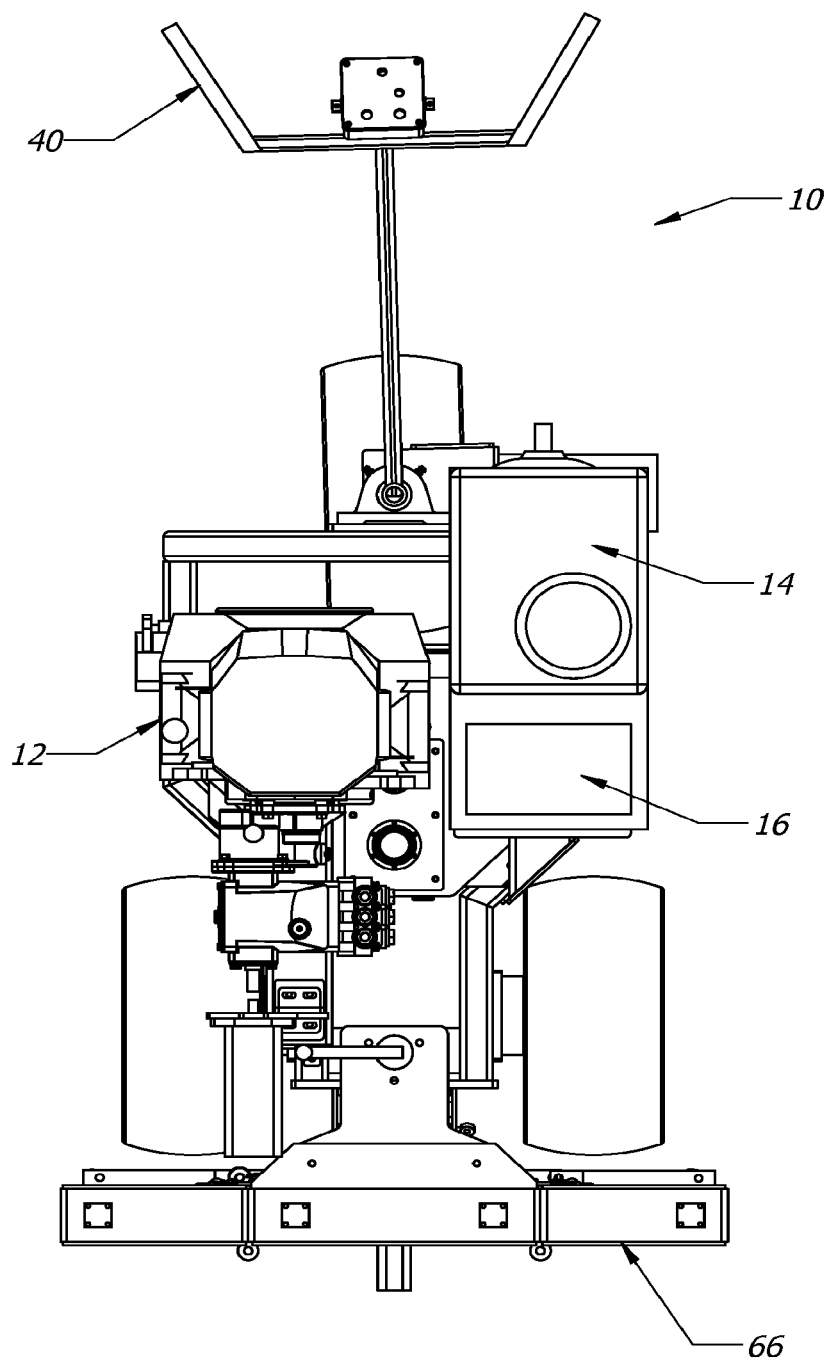
FIG. 1 is a top view of one embodiment of a soil injection system.

Certain embodiments of the present invention will now be described more fully hereinafter with reference to the accompanying drawings, in which some, but not all, embodiments of the invention are shown. Indeed, these embodiments of the invention may be in many different forms and thus the invention should not be construed as limited to the embodiments set forth herein; rather, these embodiments are provided as illustrative examples only so that this disclosure will satisfy applicable legal requirements. Like numbers refer to like elements throughout.

It will be readily understood that the components of the embodiments as generally described and illustrated in the drawings herein, could be arranged and designed in a wide variety of different configurations. Thus, the following more detailed description of the certain ones of the embodiments of the system, components and method of the present invention, as represented in the drawings, is not intended to limit the scope of the invention, as claimed, but is merely representative of the embodiment of the invention.

Embodiments of a method and a system are provided to create a uniform layer of a substance such as a hydrogel or other fluid substance underneath the soil surface with minimal or little surface disturbance to the plants, the plant roots and the soil located on or slightly below the applied surface area. It is to be clearly understood that various different embodiments may be employed to deliver a variety of different substances to the soil, and such substances may be gels or liquids. The presently preferred fluid substance is currently a hydrogel, and the present illustrated and described embodiment may be employed to inject hydrogel into soil but other fluid substances may be injected as well.

An embodiment relates to a system and method for injecting a fluid substance into soil using at least one injector probe. The at least one injector probe is driven into the soil to a target depth and a quantity of a fluid substance under pressure is dispersed into the soil at the target depth in generally circular spray pattern having a certain diameter. The at least one injector probe is retracted from the soil and moved by a distance substantially equal to the certain diameter to a new adjacent soil location to disperse additional fluid substance to form a substantially uniform layer thereof substantially at the target depth.

An embodiment of a system for injecting a fluid substance into soil includes at least one injector probe, and a driver configured to drive the injector probe into and out of the soil to and from a given level of the soil. A rotator mechanism rotates at least one injector probe about its axis to a different angular position to disperse fluid substance under high pressure for more uniform distribution thereof.

A further embodiment of a method for injecting a fluid substance into soil includes driving at least one injector probe into the soil to a given level. The at least one injection probe dispenses a first quantity of the fluid substance under pressure to the soil. The at least one injector probe is then rotated about its axis to a different angular position where a second quantity of fluid substance under pressure is dispersed to the soil. The at least one injector probe is then retracted out of the soil.

An embodiment provides a device and method for introducing a substance beneath a soil surface with minimal or little disruption of the soil surface and minimal or little damage to plants growing in the soil. An embodiment may include a slurry source, a high-pressure slurry pump, and one or more injector probes for introducing a fluid substance such as a hydrogel into the soil in a uniformly consistent manner.

In one embodiment, the injector probes or injectors include a probe inlet for receiving a slurry, and one or more probe outlets for dispersing the slurry into the soil. The probe outlets are preferably arranged so as to disperse the slurry laterally below the surface of the soil. In one aspect of an embodiment, the dispersed slurry has a lateral spread radius of between about two and about six inches in general circular patterns having given diameters of between about four inches and about 12 inches.

In another embodiment, the injection probes of the present system embodiment may be driven forceably into the soil, and then remove them from the soil, to enable the probes to be moved to an adjacent soil area. A depth adjustment may be provided to determine the depth at which a fluid substance slurry may be introduced into the soil to achieve thereby a uniformly consistent layer of fluid substance beneath the soil surface.

In another embodiment, a vibrator may be included to provide vibration to the injection probes for facilitating the introduction of the injection probes into the soil.

In a further embodiment, the injector probes may be rotatable about their vertical axes to provide a desired directional dispersal of a substance such as a hydrogel polymer substance to fill in gaps in the distributed layer.

In a still further embodiment, an injection system may include at least one self-contained power source, such as a small engine or motor, to meet the power needs of the system. Further, the system may be mounted on a carriage to transport it rollably along the soil surface. The embodiment may be compact, easily portable, and readily maneuverable around obstacles and through openings at a job site.

Yet another embodiment may include a nurse tank as a source for a fluid substance such as a hydrogel and the tank is connected in fluid communication with a high-pressure slurry pump to pressurize the fluid substance in an accumulator tank to facilitate operation of the system and to insure proper delivery pressure and flow.

One embodiment of, the present system may include high-floatation tires for a system carriage for moving the system along a soil surface. Handle bars may be used for steering the carriage.

Turning now to the drawings, wherein like numerals indicate like parts, an embodiment of a hydrogel injection system or device 10 constructed in accordance with the principles of an embodiment is provided in FIGS. 1, 1A, 1B, 2 through 4 and 11 through 13.

Referring now to FIG. 1A the system 10 includes an injector probe frame assembly 66 which is mounted rollably along the surface of the soil 11 and which may be used to inject into the soil a fluid substance such as a hydrogel. A group of injector probes 24 are mounted on and form a part of the injector probe frame assembly 66 for injecting hydrogel under pressure into the soil 11. In the present embodiment, there are four probes 25, 27, 29 and 31 mounted in a single row. It should be understood that there may be a fewer or larger number of the probes depending upon the application. A group of probe drivers generally indicated at 30 include in the present example four piston cylinder assemblies 33, 35, 37 and 39 which drive the respective probes 25, 27, 29 and 31 into and out of the soil 11.

A high pressure tank 20 helps pressurize the hydrogel in the present example for delivery via a valve 31 to inlets 15, 17, 18 and 19 of the respective injector probes 25, 27, 29 and 31 via a set of hoses or tubes 53, 54, 55 and 56 respectively. A valve 31 delivers high pressure hydrogel from an accumulator high pressure tank 20 to the parallel connection of the hoses 53, 54, 55 and 56.

According to the present embodiment, a source of hydrogel may be stored in a slurry gel tank 61 supported rollably above the soil surface 11 by means of a truck 51 or other suitable vehicle. During use of the system 10, the tank 61 may remain stationary and deliver hydrogel to the accumulator tank 20. A low pressure pump 62 supplies the hydrogel from the gel tank 61 via a long hose or tube 63 to a high pressure pump 22, which in turn supplies the hydrogel under high pressure to the high pressure tank 20 when the valve 31 is closed. In this manner, the pump 62 may, for example, pump the hydrogel at a pressure of approximately 70 psi to approximately 100 psi via the long hose 63 to the high pressure pump 22. The hose may be of a substantial length such as 300 feet to enable the group of probes 24 to move along the soil surface 11 away from the truck 51. The pump 22 may increase the pressure on the hydrogel to about 2,000 psi to about 3,000 psi for storage in the high pressure tank 20. The valve may be opened for a predetermined period of time such as ½ second to deliver a quantity of the hydrogel under high pressure to the probes 24 for dispersion into the soil 11 at a target level as shown in FIG. 1A.

Figure 11:
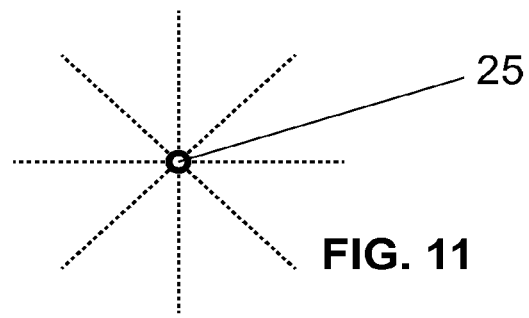
FIGS. 11-13 are a sequence of diagrammatic plan views illustrating the spray patterns of the subsoil distribution of the fluid substance according to a method of using the embodiment of FIG. 1.
Figure 12:
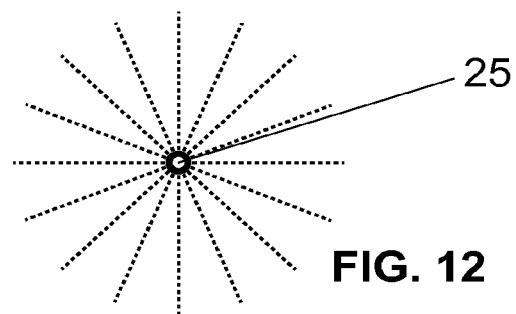
Figure 13:
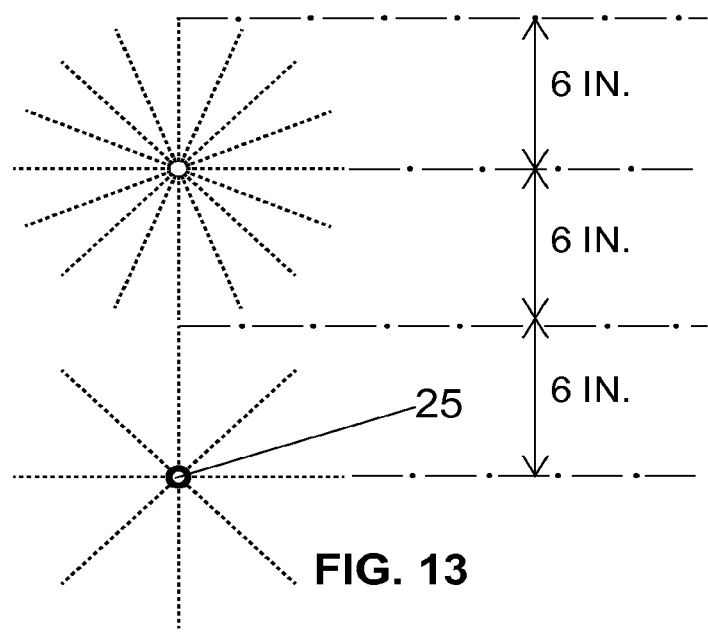

Each one of the probes such as the probe 25 as shown in FIG. 1B, includes a group of outlet holes such as an outlet hole 64 slightly above the bottom end of the probe 25. In the present example, there are 8 holes equally angularly spaced about the tubular probe 25 to emit hydrogel under pressure from the 8 holes. However, there may be a fewer or larger number of such holes for a given application. Thus the holes such as the hole 64 serve as outlets from the probe to disperse the hydrogel radially outwardly from the probe to provide a generally circular spray pattern as indicated in the diagram of FIG. 11. In so doing, a first quantity of the hydrogel is injected into the soil 11 under the control of the valve 31 to deliver the hydrogel under high pressure from the tank 20 to the probes 24. The first quantity of hydrogel is metered for a suitable period of time such as ½ second. After injecting the first quantity of hydrogel, the probes 24 are each rotated about its vertical axis to a new angular position to help fill in gaps between the previously dispersed hydrogel from each one of the radial holes in the probe. In the case where there are 8 holes in each probe, the probes may be rotated through 11 degrees to provide for an angularly displaced circular spray pattern as indicated in FIG. 12. After so doing, the probes 24 are retracted from the soil 11 so that the system 10 can be advanced along the soil surface to a different location adjacent to the initial spray pattern. In the case of having a spray pattern that emits a six inch spray from each outlet hole in the probes, the probes 24 are advanced by 12 inches to that the generally circular spray pattern will be dispersed contiguous to the previously dispersed circular spray pattern as generally indicated in FIG. 13. As indicated in FIG. 13, the second quantity of hydrogel under pressure is dispersed in a generally circular pattern contiguous to the initially dispersed pattern. After the probes 24 such as the probe 25 is rotated back through about 11 degrees, the circular spray pattern will be filled in to a greater extent similar to the initial spray pattern. Thereafter, the process is repeated by retracting the probes 24 such as the probe 25 to another location 12 inches away from the last location. The result is the introduction into the soil 11 of a layer of hydrogel at or about a target depth of about three inches to about six inches from the surface of the soil 11. The hydrogel layer then absorbs moisture for the roots of plants above the layer of hydrogel.

If the soil is very difficult to penetrate with the probes 24, the probes may be vibrated as they are being driven into the soil as hereinafter described in greater detail. On the other hand, if the soil is loose and moist the vibration may not be necessary.

The embodiment of the system 10 shown in the drawings may include, generally, an engine 12, a fuel tank 14, a battery 16, a slurry accumulator tank 20, a high-pressure slurry pump 22, a group of injection probes generally indicated at 24, a hydraulic fluid tank 26, and a hydraulic fluid pump 28. A group of probe drivers generally indicated at 30, move each probe individually into and out of the soil. Also included are a jack assembly 32, vibrator 34, and rotate piston cylinder assembly 36, for adjusting the depth of penetration of the probes. High-floatation tires 38, and handle bars 40 are mounted on a carriage 41 for supporting the system 10 rollably along the soil surface.

FIG. 1 is a top view of one embodiment of the system 10. Engine 12 provides power for system 10, specifically for high-pressure polymer slurry pump 22 and hydraulic fluid pump 28. A hydrogel stored under high pressure may also be employed. In the embodiment of system 10 shown in the drawings, engine 12 may be a small gas engine providing sufficient power such as approximately twenty horsepower to meet the requirements of system 10. While a small gas engine may be provided with the embodiments of system 10, it is contemplated that any suitable engine or motor may be used to power the present device. Suitable engines may include gas engines, diesel engines, electric motors, a combination of these or others. For embodiments of the present device requiring an onboard liquid fuel supply, such as embodiments using gas or diesel engines, fuel tank 14 may be provided. Embodiments utilizing electric motors may include a source of electrical energy such as, for example, batteries, solar panels, or the like. The embodiment of system 10 may include a battery 16 for electric start of engine 12. It is contemplated, however, that a manual crank engine, such as an engine having a pull cord attached, may also be used.

Figure 2:
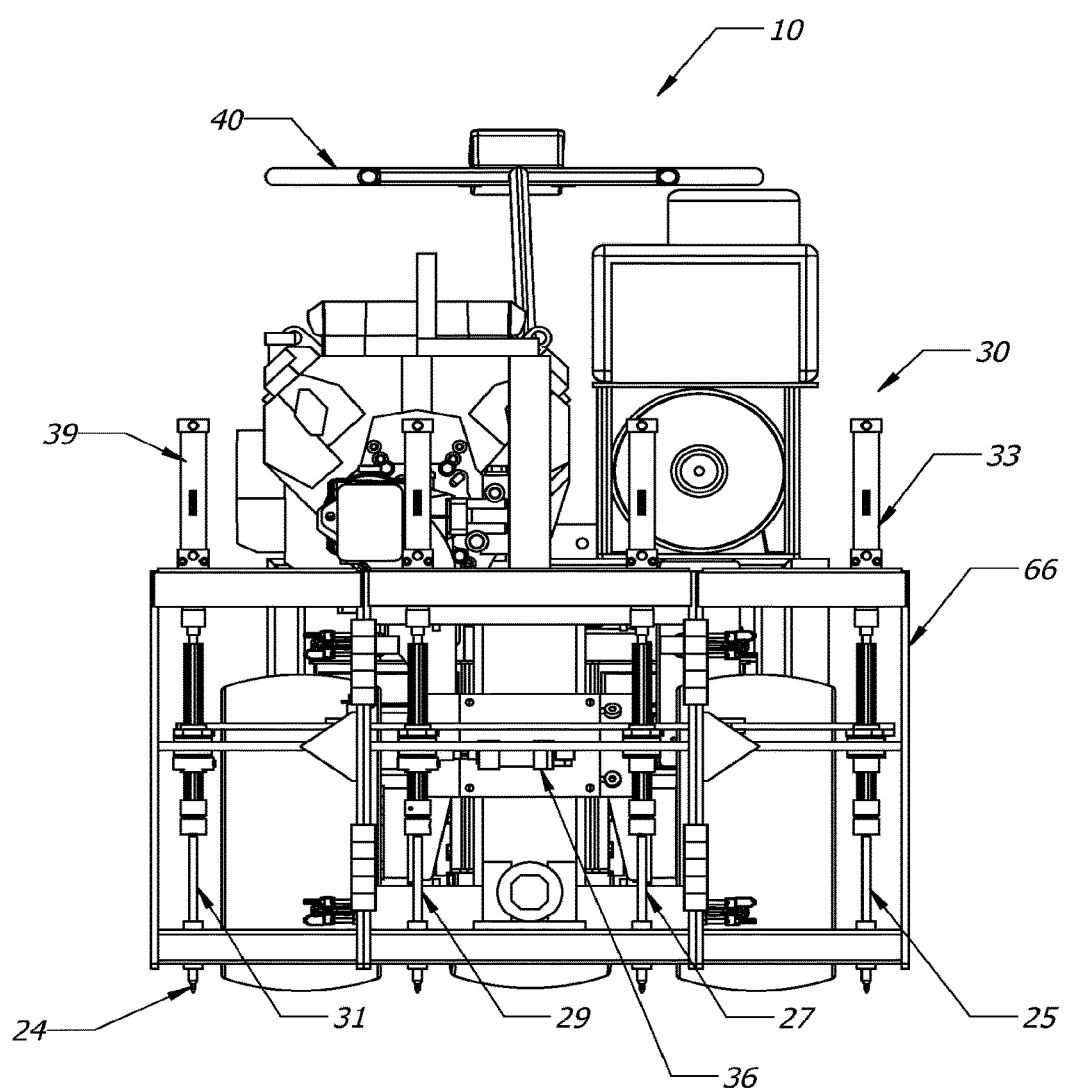
FIG. 2 is a front elevational view of the soil injection system of FIG. 1.
Figure 3:
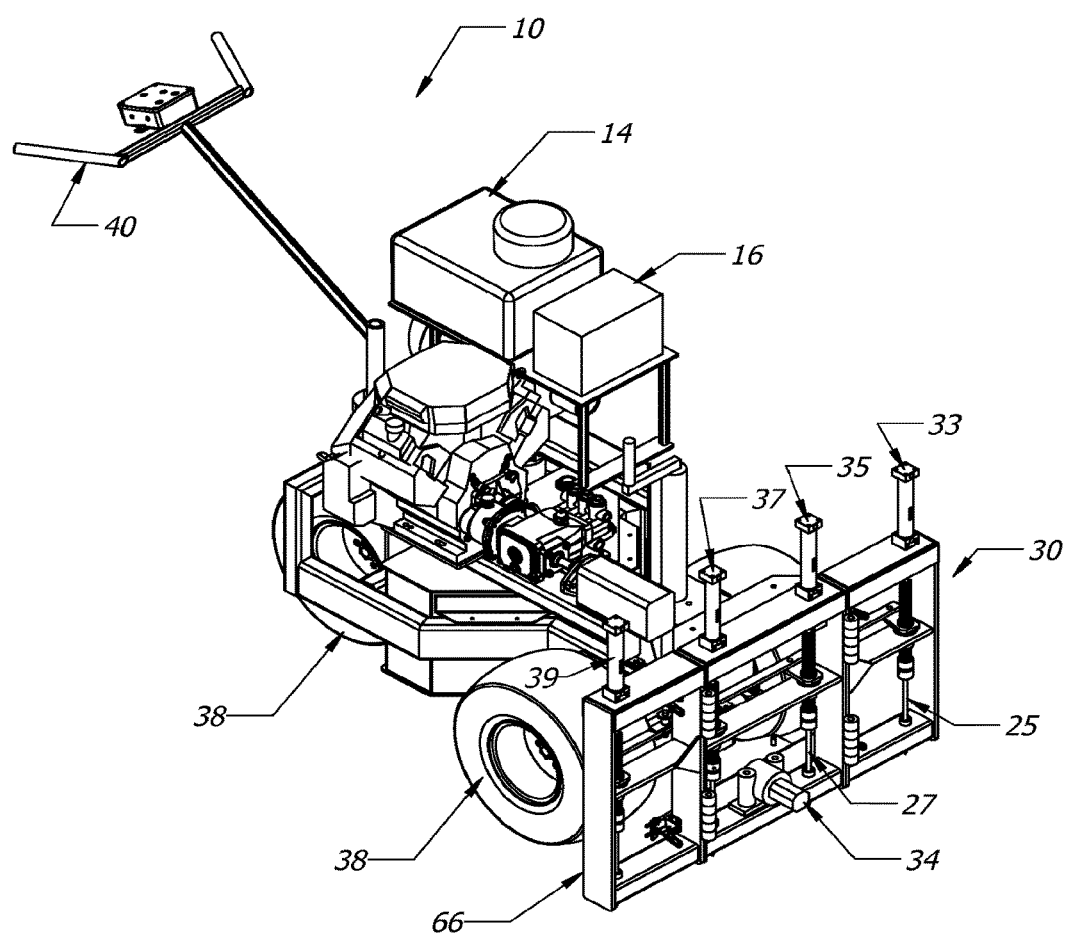
FIG. 3 is a pictorial view of the embodiment of the soil injection system of FIG. 1
Figure 4:
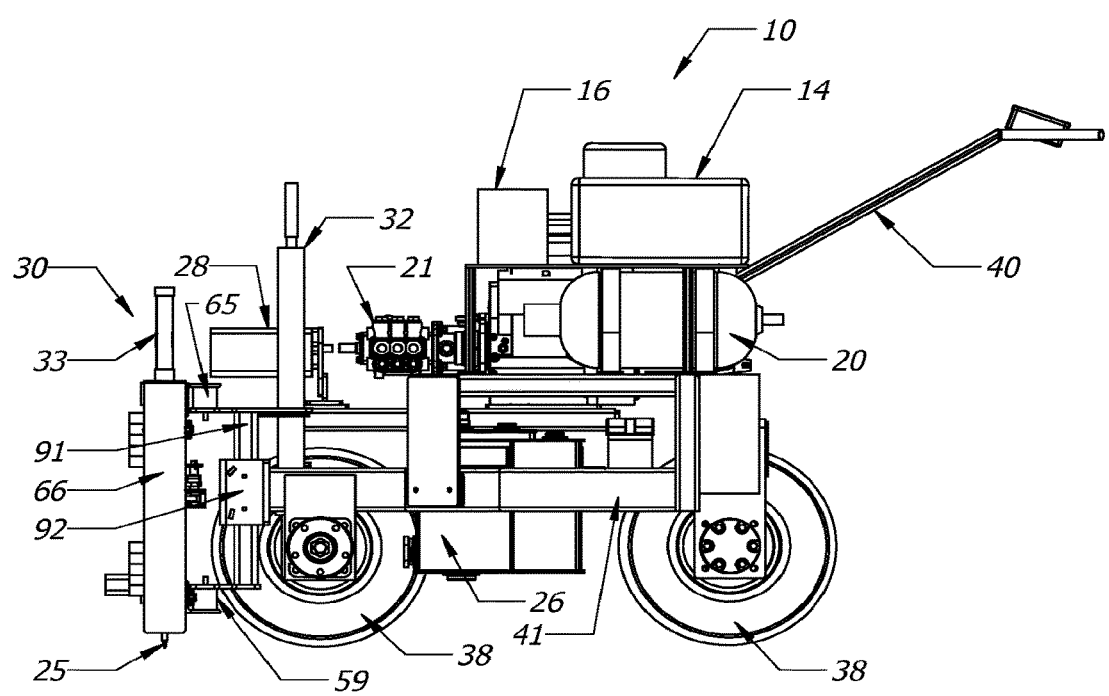
FIG. 4 is a side elevational view of the embodiment of a hydrogel injection device of FIG. 1.

System 10 includes like or similar injection probes 24, best shown in FIGS. 2 through 4. Although four injection probes 25, 27, 29 and 31 of the group of probes 24 are shown in the drawings, it is contemplated that any number of injection probes may be used as necessary or desired for any given utilization of the present device. Also, the spacing between the probes may be selected such that a closer spacing may help in compact maneuverability and wider spacing enables a wider swath of distribution. Injection probes 24 may preferably be inserted simultaneously or seriatim into turf or soil, each injection probe 24 having associated therewith one of the group of drivers generally indicated at 30 such as probe piston cylinder assemblies 33, 35, 37 and 39 for driving the respective probes 25, 27, 29 and 31 into and out of the soil. The injection probes 24 are driven into the soil to a target or given level, such, for example, between about 4 inches and about 6 inches under a surface level of the soil. The pressure associated with each driver 30 may be adjusted as needed by an operator of the present device. Further, the drivers 30 are also able to retract each respective injection probe 24 from the soil, or to alter the depth at which each injection probe 24 is disposed within the soil. A jack assembly 32 (shown in FIG. 4) is provided for adjusting the depth of injection probes 24. Drivers 30 may have a suitable stroke or path of travel, such, for example, as preferably approximately a six-inch stroke, and each time the drivers 30 are powered they may extend the full six inches. The depth of hydrogel polymer injection into the soil may be preferably controlled by moving the entire injection frame assembly 66 adjustably vertically upwardly or downwardly, via injection frame slider 50 and jack assembly 32. Drivers 30 may preferably be plumbed together as a parallel circuit protected from overloading via an adjustable relief valve (not shown).

Further, injection probes 24 may be rotated around their vertical axes by a rotation mechanism. This rotation may be facilitated by attaching the rotatable housing of each driver 30 to a bell crank that is moved by another hydraulic ram or piston cylinder assembly or other, to rotate piston cylinder assembly 36. Movement of this rotate cylinder assembly 36 may be controlled as part of the auto-sequenced injection process, described in greater detail hereinafter. Rotate cylinder assembly 36 preferably may have a four-inch stroke and may be connected to bell crank 58. As rotate cylinder assembly 36 extends, bell crank 58 pivots, rotating injection probes 24 a suitable number of degrees such as between about 11 degrees and about ninety degrees. Each injection probe 24 has a spline shaft 45 (best shown in FIG. 5) associated therewith to allow vertical as well as rotational movement of injection probes 24 via bell crank 58.

A high-pressure hydrogel slurry may preferably be provided to injection probes 24 by high-pressure polymer slurry pump 22, which draws the hydrogel slurry from a remotely-located or on-board nurse tank or receptacle in fluid communication with device 10. High-pressure polymer slurry pump 22 and polymer slurry accumulator or tank 20 are best shown in FIG. 4. High-pressure polymer slurry pump 22 may be coupled directly to the motor or engine 12 for maximum mechanical efficiency. The remaining systems, such as the ground drive for propelling the device, vibrator, and actuators, may preferably be driven through hydraulic fluid pumps and may also be driven by the motor. The slurry may be pumped from the nurse tank into the inlet of high-pressure polymer slurry pump 22. Polymer slurry accumulator or tank 20 supplements the flow of high-pressure polymer slurry pump 22 and also may help maintain pressure in the circuit when high-pressure polymer slurry pump 22 may be unloaded. Further, polymer slurry accumulator or tank 20 is able to absorb shock and pressure spikes that may occur during operation of device 10.

Figure 5:
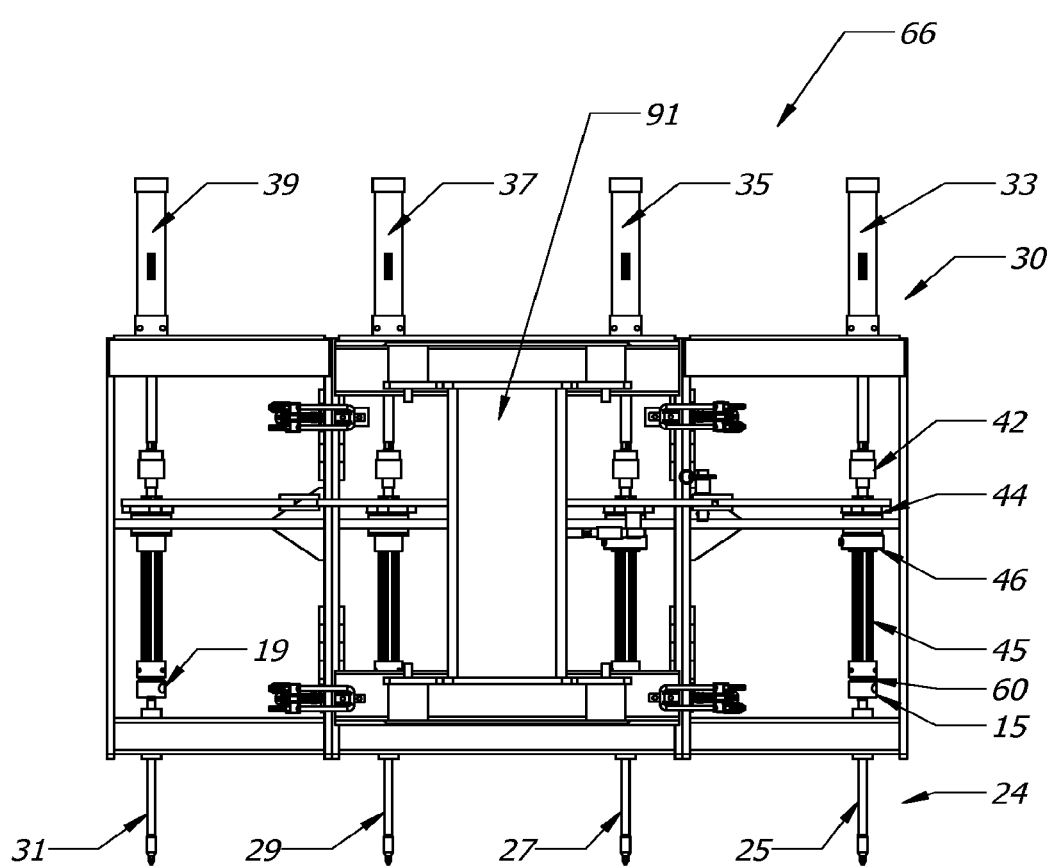
FIG. 5 is a rear elevational view of the embodiment of the injector frame assembly of the device of FIG. 1.

FIG. 5 is a front elevational view of an injection probe frame assembly 66 constructed according to the teachings of the embodiment for supporting the probes 24 and drivers 30. Injector frame assembly 66 may include rod coupling 42, flanged bushing 44, collar 46, and spline shaft 45. Four injection probes 24 are also shown extending from a lower surface of injector frame assembly 66.

Figure 6:
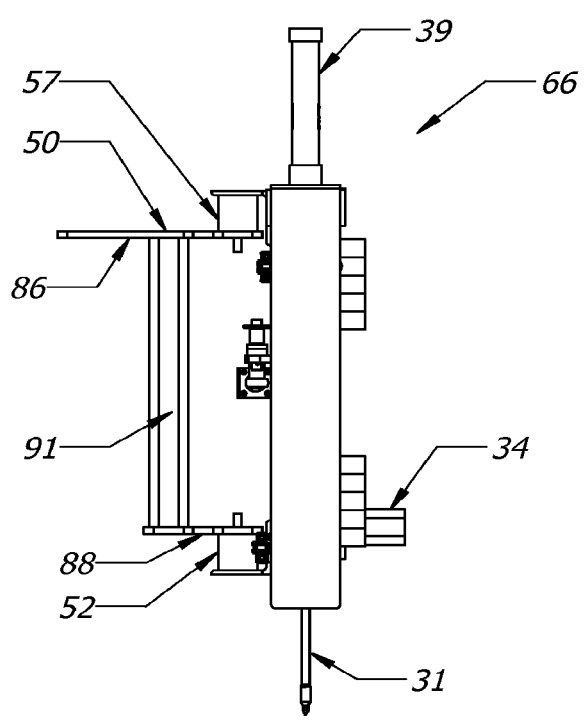
FIG. 6 is a right side elevational view of the embodiment of the injector frame assembly of FIG. 5.

FIG. 6 is a side elevational view of the injector frame assembly illustrated in FIG. 5. Shown is a vibrator 34, injection frame slider 50, and vibration isolators 52, 57, 59 and 65 (see also FIG. 8A). Vibrator 34 may preferably be a hydraulic vibrator, though it is contemplated that any suitable vibration mechanism may be used. Vibration isolators such as isolator 52 may preferably be constructed from resilient material such as rubber or other elastomeric material, though any suitable material may be used and any suitable structure may be used to isolate the vibration of injection probes 24 and vibrator 34 from the rest of device 10.

Figure 7:
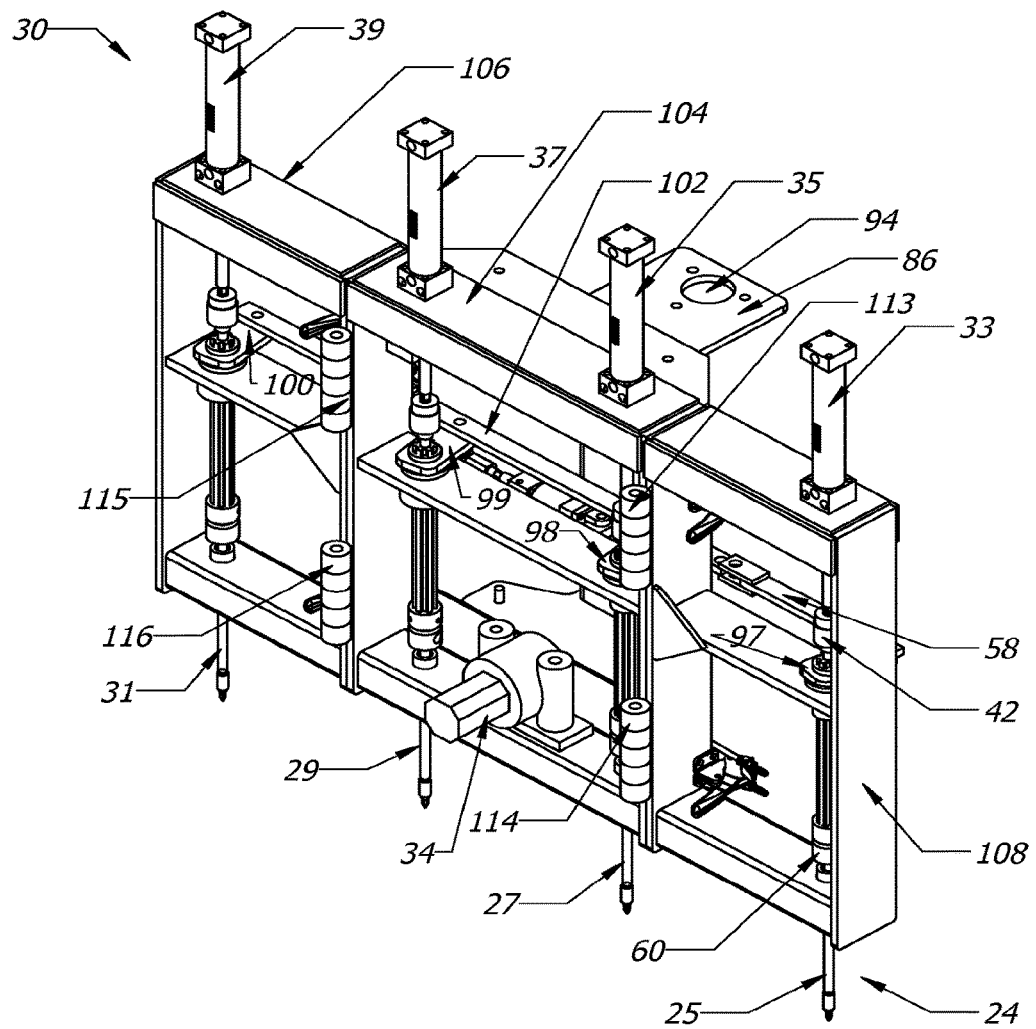
FIG. 7 is a pictorial view of the embodiment of the injector frame assembly of FIG. 5.

FIG. 7 is a pictorial view of an injection frame assembly 66 of the present embodiment. In addition to components discussed above, shown are rotate cylinder 36 and push cylinders 30, bell crank 58, and flanged bushing 60.

During use of the device, a high-pressure hydrogel slurry enters hollow injection probe or injector 24 via a probe inlet, and exits to be introduced into the surrounding soil via a probe outlet. The hydrogel may disperse in a direction parallel to a plane of the soil, and to a radial distance of between about 2 inches and 6 inches, and more preferably between about 4 inches and about 5 inches. The presently preferred distance may be contemplated be about 6 inches.

As shown in FIGS. 1 through 4, system 10 also includes a plurality of high-floatation tires 38, as well as handle bars 40. The precise number and arrangement of high-floatation tires 38 may vary depending on the needs or desires of an operator of the present device. Further, the disposition of handle bars 40 may likewise be altered. Any suitable mechanism for steering and allowing the device to move across the surface of turf or soil being injected may be utilized. It is also contemplated that the system 10 may be self propelled, manually pushed, or pulled behind a tractor or other vehicle. Other arrangements may also be employed.

In the embodiment of system 10 shown in the drawings, steering and speed control may be effected manually by the operator of device 10. Auto-sequencing of actuators may be controlled via an onboard programmable controller (not shown). The engine, pumps, valves, and actuators may all be mounted on a compact frame to allow for easy maneuverability and passage through narrow openings, such as a typical yard fence or gate. The compact size of the device may also allow portability, such that device 10 may be delivered to a jobsite using a small truck or trailer (not shown). Further, the size allows a single operator to operate system 10 with little or no difficulty, may allow the operator to easily maneuver around trees, shrubs, and other obstacles.

Example—Operation of the Device

An exemplary operation of the embodiment of system 10 shown in the drawings is now described. Once system 10 has been transported to a work site, the operator of the device may unload it from a truck, trailer, or other transport and moves system 10 to the work area. A polymer slurry or other slurry or liquid delivery hose 63 may be attached, on one end to an outlet of the transfer pump 62, where it may draw from the nurse gel tank 61 on the truck containing a hydrogel slurry and, on the other end, to the inlet of the high-pressure polymer slurry pump 22. The exemplary nurse tank 61 may hold a suitable quantity such as about 200 gallons of polymer slurry, and pump, for example, about four to five gallons per minutes at around 50 psi. When the flow to high-pressure polymer slurry pump 22 has been established, the operator may select a start point and may begin the injection process.

The operator may initiate an auto-sequenced injection process, causing injection probes 24 to be inserted into the soil. At the appropriate depth, as predetermined by the operator, a control valve may release a timed charge of hydrogel into the soil. As the charge is released, injection probes 24 may be rotated between about 11 degrees and about 90-degrees about their vertical axes to facilitate better distribution of the hydrogel. After injection of the hydrogel is complete, injection probes 24 may be retracted and the operator may drive the machine forward a desired distance and once again may initiate the auto-sequenced injection process. The steps above may be repeated until the pass is complete. The operator may then begin a second pass.

The hydrogel polymer injected by system 10 may be preferably inserted at a target depth of about three to about six inches beneath the surface of the soil, and preferably has a lateral spread radius of about two inches to about six inches, which provides between about a four inch diameter and about a 12 inch diameter spray pattern The lateral spread radius may be adjusted by adjusting the composition of the slurry and/or the flow rate.

Figures 8A, 8B:
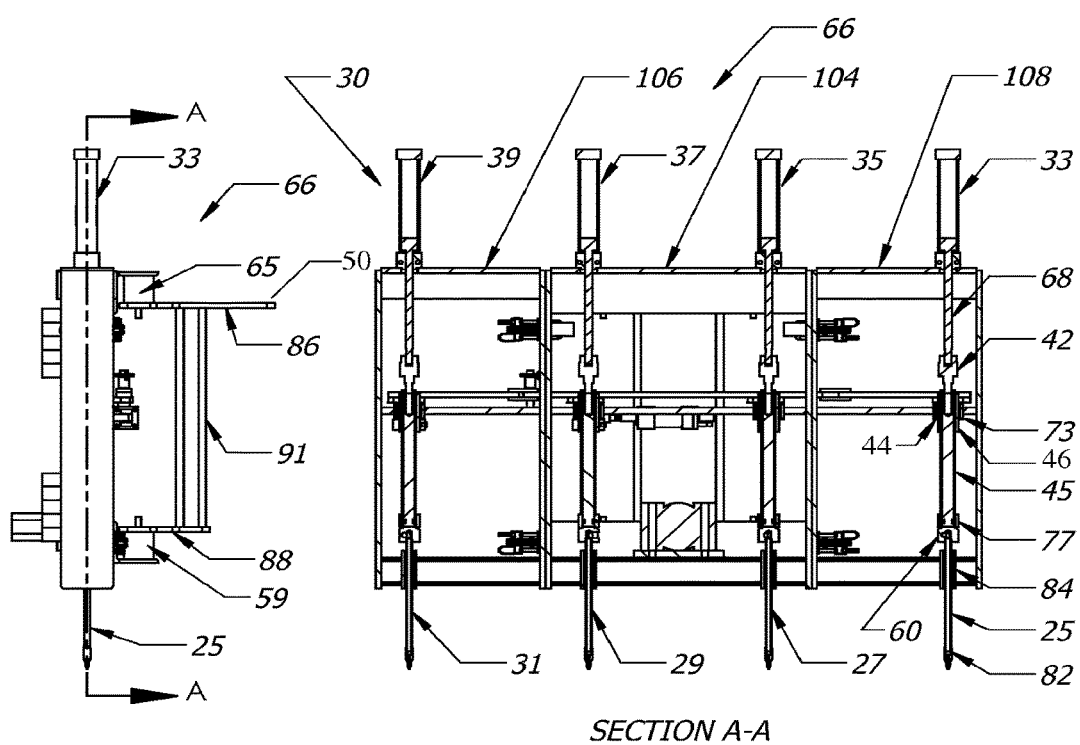
FIG. 8A is a left side elevational view of the embodiment of the injector frame assembly of FIG. 5.
FIG. 8B is a sectional view of the injector frame assembly of FIG. 8A.

Considering now the injector probes such, for example, as probe 25 is best seen in FIG. 8B, the probe assembly 25 is fixed at its upper end to a piston rod 68 of the piston cylinder assembly 33 by means of a rod coupling 42, which in turn is fixed to the bushing assembly 44. The bushing assembly 44 includes a bushing 73 to facilitate rotation of the injector probe 25 within the collar 45 having an internal spline (not shown) for engaging grooves on the spline shaft 45 to enable the bell crank 58 to rotate the spline shaft 45 and thus the injector probe 25 about its axis. Bushing 73 includes internal bearing (not shown) for facilitating rotation of the injector probe 25. Additionally, bushing 73 facilitates reciprocative movement toward and away from the soil 11. Bushing assembly 60 at the bottom end of the spline shaft 45 connects it with the upper end of hollow probe 82 of the injector probe 25 to enable the hollow probe 82 having a pointed distal end to be driven into the soil 11 and retracted therefrom. A bearing sleeve 84 surrounds the hollow probe 82 to guide it in its reciprocative movement.

Figure 9:
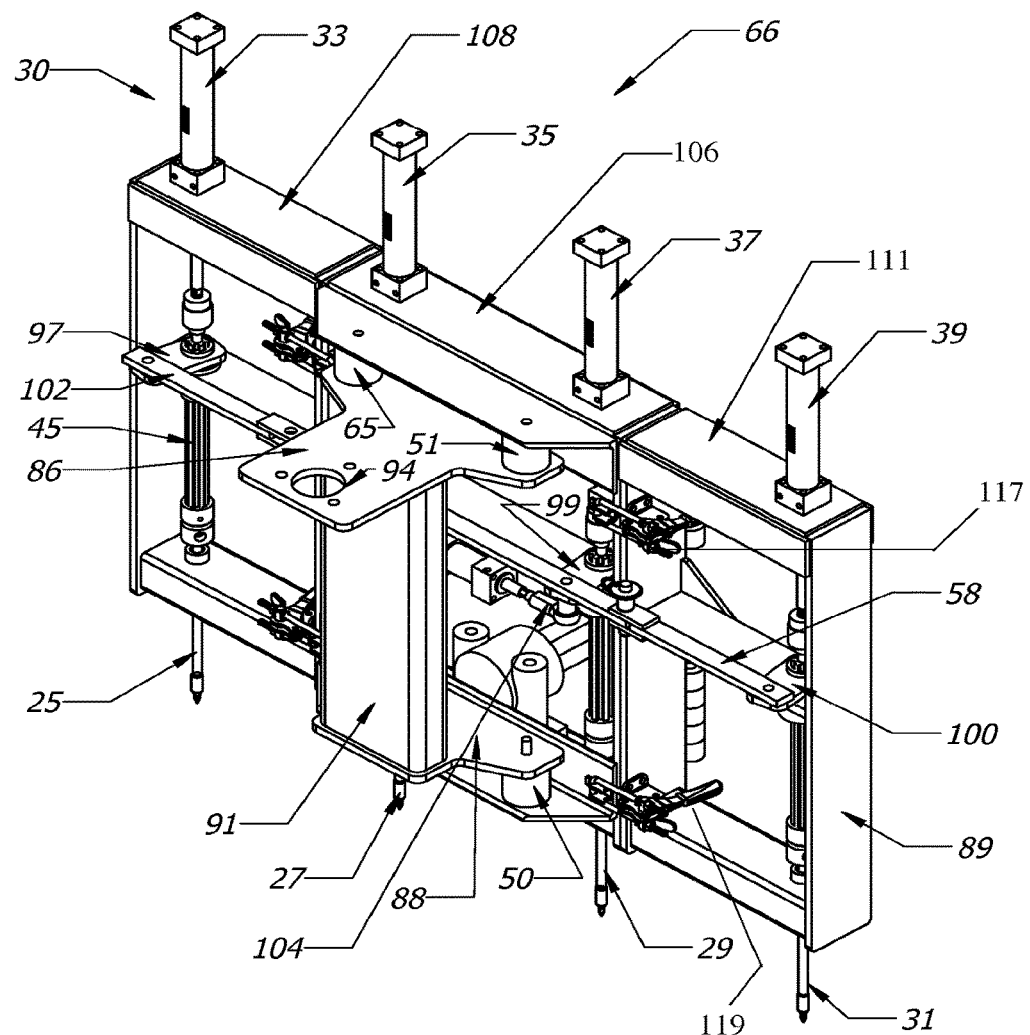
FIG. 9 is a front elevational view of the injector frame assembly of FIG. 5.
Figure 10:
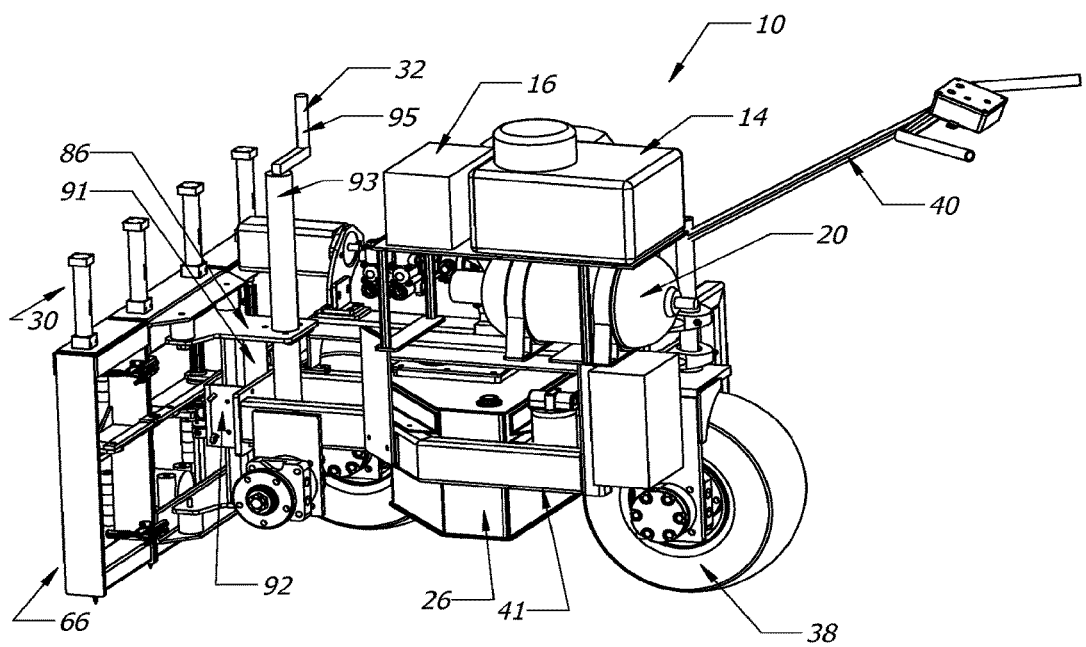
FIG. 10 is a pictorial view of the injector frame assembly of FIG. 5, illustrating probe height adjustment.

Considering now in greater detail the jack assembly 32 with particular reference to FIGS. 4, 9 and 10, the frame slider 50 includes a rearwardly horizontally extending pair of upper and lower tongues 86 and 88 which are fixed to a rectangular frame 89 of the frame assembly 66. An upstanding sliding bar 91 is fixed at its opposite ends between the tongues 86 and 88 to be received telescopically within a sleeve 92 mounted on the carriage 41 of the system 10 to enable the entire frame assembly 66 to be moved upwardly or downwardly in an adjustable manner for adjusting the depth of penetration of the injector probes 24.

The jack assembly 32 may be a conventional trailer tongue jack, which includes an upstanding telescoping pair of tubes 93 extending within a tongue opening 94 and fixed to the upper larger tongue 86, so that jack assembly 32 can raise and lower the frame assembly 66 adjustably. As shown in FIG. 10, a crank handle 95 of the jack assembly 32 may be rotated manually to cause the outer tube of the telescoping tubes 93 to be raised or lowered to in turn adjust the height of the frame assembly 66 relative to the soil. The inner telescoping tube (not shown) is fixed at its bottom end to the carriage 41 and the outer tube moves vertically relative thereto by means of an internal screw drive (not shown) rotated by the crank handle 95.

Considering now in greater detail the bell crank 58 with particular reference to FIGS. 7, 8A and 9, the bell crank 58 includes a set of crank ears 97, 98, 99 and 100, which are fixed to the corresponding spline shafts such as the spline shaft 45 for rotating them when a crank bar 102 is driven by the distant cylinder assembly 36. The piston rod of the piston cylinder assembly 36 is connected via an L-shaped cylinder coupler to the crank bar 102.

Considering now the rectangular frame 89 for the frame assembly 66 with particular reference to FIGS. 7, 8B and 9, the frame 89 comprises a central frame component 106 and a pair of right and left side frame components 108 and 111 to enable the frame 89 to fold when not in use so that the system 10 is more compact when moving it along the ground to avoid obstacles and fit between narrow spaces. A pair of hinges 113 and 114 connect the right side frame component 108 to the central frame component 106, and similarly a pair of hinges 115 and 116 connect the left side frame component to the central frame component 106. A series of latches such as latches 117 and 119 fix releasably the side frame components to the central frame component.

Hydrogel Composition

A variety of hydrogel compounds are known in the art, and it is contemplated that any suitable hydrogel slurry may be used in conjunction with system 10. Polyacrylamide (PAM), starch, and polyacrylate gels may be routinely used for agricultural purposes. The dry gels are crystal-like in nature and rigid. When water is introduced, however, the gels swell and may incorporate from about 200 to about 600 times their weight in water. Hydrogels that contain about 70% by weight of water, or more, may be easily deformed such that they will pass through a pump and injection apparatus as described herein. Any suitable hydrogel, including biodegradable and biologically-derived hydrogels, whether in existence as of this writing or developed at a later time, may be used or other substances such as liquids or gels or others, in conjunction with the present embodiment.

The foregoing description of the present device is exemplary and provides a detailed illustration of certain embodiments of the present invention. It is contemplated, however, that a variety of modifications to the present invention will be ascertainable to one of skill in the art upon reading this disclosure. Further, the details provided above are not intended to be limiting, and many features or aspects of the device and method of using it, may be modified without departing from the spirit or scope of the present invention.

Although the invention has been described with reference to the above examples, it will be understood that many modifications and variations are contemplated within the true spirit and scope of the embodiments of the invention as disclosed herein. Many modifications and other embodiments of the invention set forth herein will come to mind to one skilled in the art to which the invention pertains having the benefit of the teachings presented in the foregoing descriptions and the associated drawings. Therefore, it is to be understood that the invention shall not be limited to the specific embodiments disclosed and that modifications and other embodiments are intended and contemplated to be included within the scope of the appended claims. Although specific terms are employed herein, they are used in a generic and descriptive sense only and not for purposes of limitation.

What is claimed is:

1. An apparatus for injecting a fluid substance into soil, comprising: at least one injector probe having:
   a central axis;
   an inlet for receiving the fluid substance;
   at least one outlet for dispersing in a layer and at a pressure a quantity of the fluid substance at a target depth beneath a surface of the soil;
   a driver to drive the at least one injector probe into and out of the soil to and from the target depth; and
   a rotator mechanism configured to rotate the at least one injector probe about the central axis from one angular position to another angular position at the target depth.

2. The apparatus of claim 1, further comprising a depth adjustment for adjusting the target depth of the at least one injector probe.

3. The apparatus of claim 1, further comprising a vibrator coupled to the driver to assist driving the injector probe into the soil.

4. The apparatus of claim 1, further comprising a tank for storing the fluid substance and a pump for delivering the fluid substance to the inlet at the pressure.

5. The apparatus of claim 1, further comprising an accumulator tank for supplementing flow of the fluid substance and maintaining the pressure.

6. The apparatus of claim 1, further comprising a probe frame assembly for supporting the at least one injector probe and the driver.

7. The apparatus of claim 6, further including a carriage mounted on a set of wheels to support the probe frame assembly rollably along the surface of the soil.

8. The apparatus of claim 6, wherein the probe frame assembly is foldable.

9. A method for injecting a fluid substance into soil, comprising:
   (i) driving at least one injector probe into the soil such that at least one outlet of the at least one injector probe is at a target depth beneath the surface of the soil;
   (ii) dispersing the fluid substance at a first angular position, at a pressure and at the target depth beneath the surface of the soil;

(iii) rotating the at least one injector probe about a central axis to a second angular position at the target depth; and (iv) dispersing the fluid substance at the second angular position, at the pressure and at the target depth beneath the surface of the soil.

10. The method of claim 9, further comprising vibrating the injector probe during the driving.

11. The method of claim 9, wherein the dispersing at the first angular position and at the second angular position comprises releasing a timed charge of the fluid substance.

12. The method of claim 9, wherein the fluid substance is dispersed in a circular spray pattern having a diameter.

13. The method of claim 12, further comprising (v) retracting the at least one injector probe, (vi) moving the at least one injector probe along the surface of the soil a distance equal to about the diameter, and (vii) repeating steps (i) through (iv).

14. The method of claim 9, further comprising adjusting the target depth of the at least one injector probe.

15. A system for injecting a fluid substance into soil, the system comprising:
 a slurry tank;
 a slurry pump;
 an injector frame assembly having a plurality of injector probes;
 a plurality of probe drivers, wherein each of the plurality of probe drivers moves a respective injector probe into and out of soil to and from a target depth; and
 a rotator assembly, wherein the rotator assembly rotates each of the plurality of injector probes about a respective central axis from one angular position to another angular position at the target depth; and
 wherein the fluid substance is pumped from the slurry tank by the slurry pump to the plurality of injector probes and the plurality of injector probes each disperse a quantity of the fluid substance into the soil at a pressure and at the target depth.

16. The system of claim 15, further comprising a carriage mounted on a set of wheels, wherein the injector frame assembly is supported by the carriage.

17. The system of claim 16, wherein the system further comprises a power source and is self-propelled.

18. The system of claim 15, wherein the pressure at each of the plurality of injector probes is adjustable.

19. The system of claim 15, wherein the plurality of injector probes are moved into and out of the soil simultaneously.

20. The system of claim 15, wherein the plurality of injector probes are moved into and out of the soil seriatim.

* * * * *